US006486825B1

(12) United States Patent
Smithey

(10) Patent No.: US 6,486,825 B1
(45) Date of Patent: Nov. 26, 2002

(54) RUNWAY INCURSION DETECTION AND WARNING SYSTEM

(75) Inventor: Donald L. Smithey, Omaha, NE (US)

(73) Assignee: Omaha Airport Authority, Omaha, NE (US)

( * ) Notice: Subject to any disclaimer, the term of this patent is extended or adjusted under 35 U.S.C. 154(b) by 0 days.

(21) Appl. No.: 09/848,106

(22) Filed: May 2, 2001

(51) Int. Cl.$^{7}$ .......................... G01S 13/93; G08G 5/06; G08G 5/00

(52) U.S. Cl. ............................ 342/29; 342/27; 342/36; 342/59; 342/175; 342/195; 340/933; 340/945; 340/961

(58) Field of Search ......................... 342/27–32, 36–40, 342/42–49, 59, 61, 63, 175, 195, 26; 340/933, 945, 961, 947–957

(56) References Cited

U.S. PATENT DOCUMENTS

| | | | | | |
|---|---|---|---|---|---|
| 2,514,436 | A | | 7/1950 | Alvarez | |
| 3,152,315 | A | | 10/1964 | Rodgers | |
| 3,855,571 | A | | 12/1974 | Massa | |
| 3,872,474 | A | | 3/1975 | Levine | |
| 4,360,795 | A | | 11/1982 | Hoff | |
| 4,516,125 | A | | 5/1985 | Schwab et el. | |
| 5,170,162 | A | | 12/1992 | Fredericks | |
| 5,179,384 | A | | 1/1993 | De Haan | 342/37 |
| 5,268,698 | A | | 12/1993 | Smith, Sr. et al. | 342/450 |
| 5,300,933 | A | | 4/1994 | Discenza et al. | 342/36 |
| 5,334,982 | A | | 8/1994 | Owen | 342/36 |
| 5,374,932 | A | | 12/1994 | Wyschogrod et al. | 342/36 |
| 5,400,031 | A | | 3/1995 | Fitts | 342/36 |
| 5,448,243 | A | | 9/1995 | Bethke et al. | 342/59 |
| 5,508,697 | A | * | 4/1996 | Kato et al. | 340/553 |
| 5,530,440 | A | * | 6/1996 | Danzer et al. | 340/933 |
| 5,557,278 | A | * | 9/1996 | Piccirillo et al. | 342/29 |
| 5,574,648 | A | | 11/1996 | Pilley | |
| 5,629,691 | A | * | 5/1997 | Jain | 340/961 |
| 5,724,040 | A | * | 3/1998 | Watnick | 342/26 |
| 5,933,098 | A | | 8/1999 | Haxton | |
| 5,933,099 | A | | 8/1999 | Mahon | |
| 6,023,235 | A | | 2/2000 | Sauer | 342/25 |
| 6,044,322 | A | | 3/2000 | Stieler | |

FOREIGN PATENT DOCUMENTS

| | | | | | |
|---|---|---|---|---|---|
| EP | 370965 | A2 | | 5/1990 | |
| EP | 370965 | A3 | | 5/1990 | |
| EP | 0785536 | A1 | * | 7/1997 | G08G/5/06 |

* cited by examiner

*Primary Examiner*—Bernarr E. Gregory
(74) *Attorney, Agent, or Firm*—Christie, Parker & Hale, LLP

(57) ABSTRACT

An airport runway incursion detection and warning system for monitoring ground traffic in he vicinity of a runway or taxiway of an airport. The system utilizes a microwave radar transceiver, commonly referred to as a motion detector, connected to a voice annunciator to provide a verbal warning of aircraft or ground vehicle runway incursion. In one embodiment, the microwave transceiver is integrated into a runway lamp and includes a transformer to all w the transceiver to operate from an existing runway lamp power system.

22 Claims, 2 Drawing Sheets

RUNWAY INCURSION DETECTION AND WARNING SYSTEM

BACKGROUND OF THE INVENTION

This invention relates to the field of airport ground traffic control systems and ore particularly to a system for determining aircraft position an airport surface and for providing warnings of potential collisions.

Unauthorized incursions f aircraft and ground vehicles onto runways and taxiways can often have catastrophic results. The number of aircraft accidents hat occur on the ground is nearly three times the number of aircraft accidents that occur in the air.

In poor visual conditions the problem becomes even worse since the ground controller is often reliant on non-visual information such as voice communications from the cockpit crew, reporting an aircraft's current position on the airport surface, or on display information from a ground traffic control radar system. Unfortunately, due to their prohibitive cost, only some of the largest airports in the United States have ground traffic control radar systems to aid the controller. The remainder of U.S. airports depend solely on the visual observations of flight controllers and on position reports from pilots. Of the airports which have ground traffic control radar, some of these systems are modern systems such as the ASDE-3 systems. However, many existing ground traffic control radars are over twenty years old, are difficult to maintain, and ay provide inadequate information in poor weather because rain, snow, and fog tend to interfere with the radar signals. Thus in a large number of airports, during poor weather conditions, the flight controllers are often literally reduced to asking air crews "where are you?" to locate aircraft on the airport surface Fortunately, for any particular airport there are generally only a few taxiway/runway intersections that are critical intersections, i.e., those intersections that have a history of an excessive number of runway incursions.

What is needed therefore is a reliable yet low cost system that provides a warning of unauthorized runway incursions to the flight controllers. Ideally such a system will provide an audible warning to flight con rollers since the controllers are typically continually watching their air traffic control screens and may not notice a purely visual warning of a runway incursion. In addition, such a system should be free from the poor weather operational problems associated with conventional radar warning systems.

SUMMARY OF THE INVENTION

The present invention is a simple, low cost, but effective, runway incursion warning system for monitoring the critical runway/taxiway intersections of an airport and for communicating data indicative of a possible runway incursion to flight controllers or other airport personnel. The system uses off-the-shelf microwave radar motion detectors for detecting the approach of aircraft, ground vehicles or people. A microwave radar system has important advantage over a conventional radar system. Most notably, due to the comparatively short wavelengths of microwaves, such systems are to as affected by rain, snow, or fog, as are conventional radar systems.

In the system of the present invention, microwave radar transceivers or motion detectors are located at predetermined installation sites adjacent to selected runways and/or taxiways of the airport. The motion detectors include a transmitter unit and a receiver unit. The detectors operate by transmitting microwaves in a cone shaped dispersion pattern. When an aircraft or a ground vehicle enters the dispersion pattern some of the microwaves are reflected back to the motion detector and are detected by the receiver unit. Commonly available motion detectors may be configured t o detect motion in one direction only, thus the system of the p resent invention may be configured to selectively detect either incoming or outgoing traffic. The detectors may also be arrange in pairs to detect the direction of travel of an aircraft or vehicle.

In the system of the present invention, when the detectors detect the approach of an air raft or ground vehicle, a signal is transmitted to an annunciator located in the tower. The annunciator provides a verbal warning to tower personnel of a potential runway intrusion. Preferably, the annunciator is programable so that different voices will provide warnings depending upon, for example, where the runway intrusion is occurring. This feature is highly advantageous, in that by using a different voice to indicate a runway intrusion at each critical area, tower personnel will be able to immediately recognize where the intrusion has occurred without waiting to hear the complete warning. A further advantage of the present invention system is that it operates at low power and may utilize the existing cabling normally provided for runway lights. In one particularly preferred embodiment, the motion detector and associated hardware are integrated with a typical runway lamp. These and other features of the invention will become more apparent from the following detailed description of the invention, when taken in conjunction with the accompanying exemplary drawings.

DETAILED DESCRIPTION OF THE INVENTION

Figure 1:
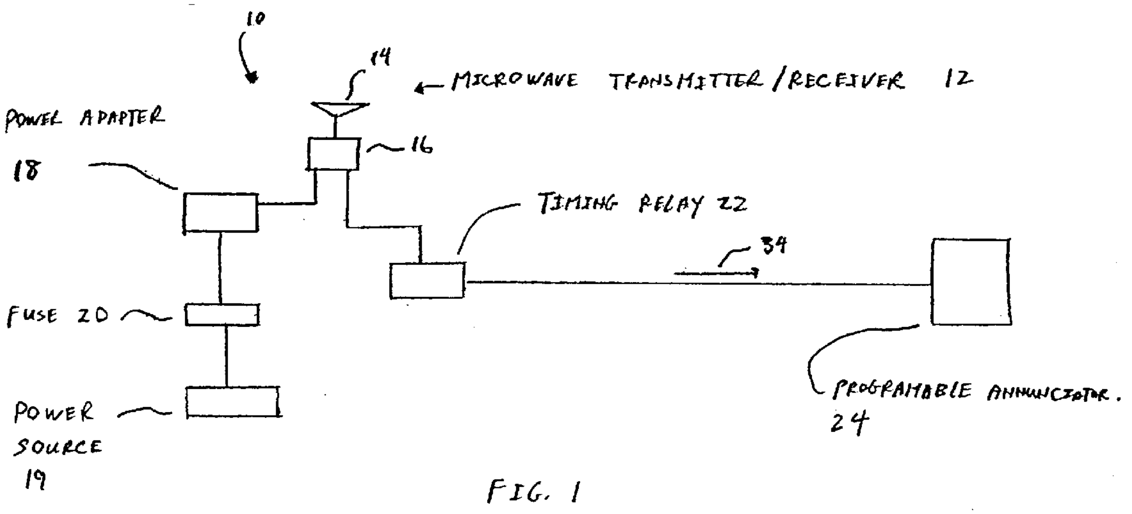
FIG. 1 is a schematic illustration of the system of the present invention.

An exemplary system embodying the present invention shown in FIG.1 comprises a microwave radar transceiver 12, which is commonly referred to as a motion detector, a power adapter 18, a fuse 20, a timing relay 22, and a programable annunciator 24.

Figure 3:
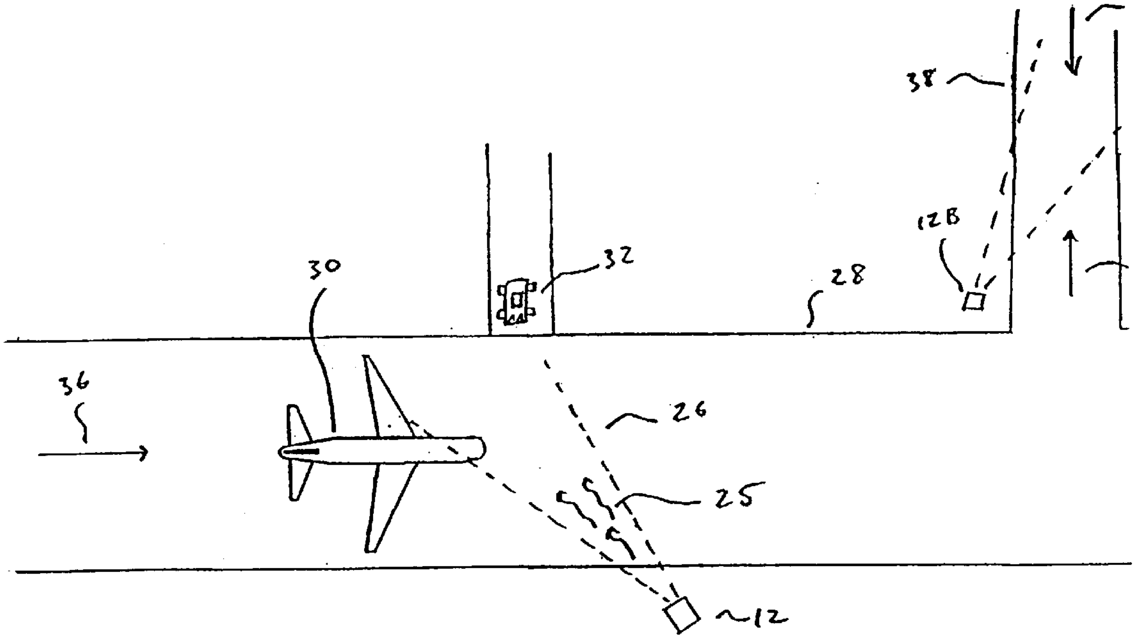
FIG. 3 is a schematic illustration of a motion detector in accordance with the present invention disposed adjacent to a runway.

Referring now to FIGS. 1 and 3, the microwave transceiver 12 includes a transmitter unit 14 and a receiver unit 16. In this exemplary embodiment, the transmitter broadcasts microwaves 25, in a cone shaped dispersion pattern 26, across a taxiway or runway 28. When a moving object such as an aircraft 30, or a ground vehicle 32, enters the dispersion pattern some of the microwaves are reflected back to the receiver unit which detects the reflected microwave radiation and generates a signal 34 indicative of the aircraft or ground vehicle present in the dispersion pattern. The microwave transceiver operates using Doppler effect principles, which are known to those skilled in the art. One of the features of Doppler effect microwave transceivers of the type used in the present invention is that the transceiver may selectively detect either incoming or outgoing traffic. This feature is particularly important in that often it is desirable to detect only those aircraft or ground vehicles that are entering a runway or taxiway from the wrong direction.

Referring now to FIG. 3, if aircraft landing on the runway 28, in the direction 36, are directed to exit the runway on a particular "exit" taxiway 38, generating a warning when any aircraft enters the exit taxiway is of little value in that most of aircraft entering the exit taxiway are aircraft which have just landed and are leaving the runway, in the correct direction as indicated by arrow 40. However, if the microwave transceiver 12B is set to detect only incoming traffic, all exiting aircraft are ignored and only aircraft r ground vehicles traveling in an incorrect direction, i.e., towards the runway, as indicated by arrow 42, are detected.

The ability to selectively detect only incoming or outgoing traffic is further advantageous in that often airports change the direction in which aircraft takeoff or land on a particular runway. Thus, with continued reference to FIG. 3, if the airport directed aircraft to takeoff in a direction opposite to that shown by arrow 36, taxiway 8 would then become the runway "approach" taxiway and the correct direction of travel would then be towards the runway, as shown by arrow 42. Thus, detecting aircraft traveling towards the runway now is of little value, while detecting aircraft traveling away from the runway, as depicted by arrow 40, is critical. However, this change in critical direction can be readily accommodated by resetting the microwave transceiver 12B to detect only outgoing traffic, i.e., only traffic moving in the direction 40. In the transceivers of the exemplary embodiment, this change in sensing direction is accomplished by resetting an internal switch in the transceiver. Microwave transceivers suitable for use with the system of the present invention are known in the art and are available from Microwave Sensors, Inc., of An Arbor, Mich., among others.

Figure 4:
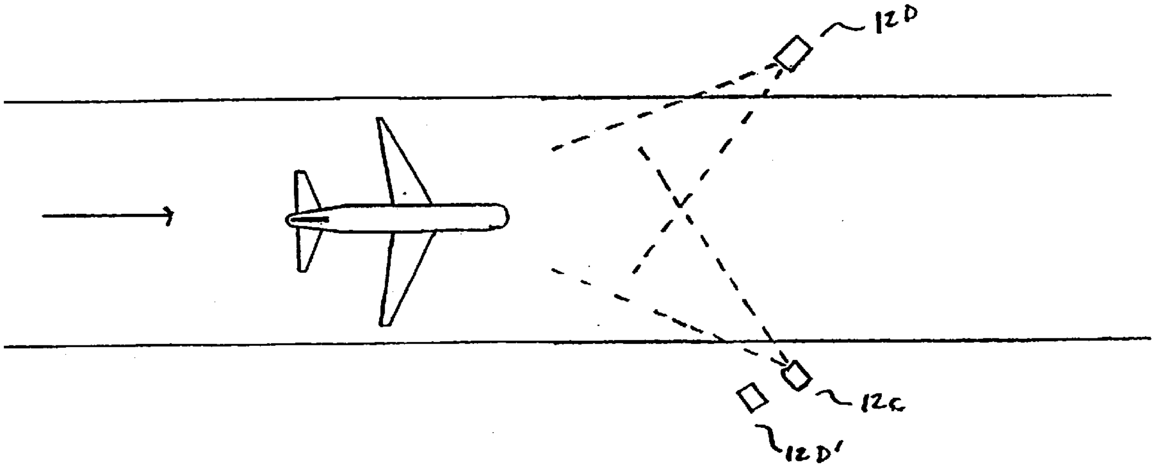
FIG. 4 is a schematic illustration of two motion detectors in accordance with the present invention disposed adjacent to a runway in such a manner that the direction of travel of an aircraft or ground vehicle ma be determined.

Referring now to FIG. 4, here is shown an arrangement of microwave transceivers in which two transceivers may be used to determine the direction in which an aircraft or vehicle is traveling on a runway or taxiway. As shown in FIG. 4, a transceiver 12C is located on one side of the runway and is set to detect outgoing traffic. Another transceiver 12D is located on the opposite side of the run way and is set to detect incoming traffic. When set up in this manner, airport personal can determine the direction of travel of any vehicle on the runway or taxiway depending on whether the incoming or outgoing transceiver is triggered. The transceivers may also be situated side by side as shown by transceivers 12C and 12D'. It is required that one transceiver be set to detect incoming traffic and that the other be set to detect outgoing traffic.

Referring again to FIG. 1, the signal 34 generated by the microwave transceiver 12, upon detecting an aircraft or vehicle, is transmitted to the annunciator 24. The annunciator upon receiving the signal plays prerecorded warning. In the exemplary embodiment, the annunciator is capable of responding to 64 input channels with a unique prerecorded voice message for each channel. Therefore, an airport may deploy multiple transceiver's where each transceiver is associated with a unique voice and/or warning message. This feature is highly advantageous, in that by using a different voice to indicate a runway intrusion at each critical area, tower personnel will be able to immediately recognize where the intrusion has occurred without waiting to hear the complete warning. Those skilled in the art will understand that annunciators with more or less capability than that of the exemplary embodiment may be used with the present invention warning system. For example, annunciators may be tailored to have more or less input channels. In small airports, with only a few critical runway/taxiway or other intersections, only a few channels may be needed. Annunciators are known in the art. The annunciator used in the exemplary embodiment of the present invention warning system may be obtained from RACO Manufacturing and Engineering Company of Emeryville, Calif.

With continued reference to FIG. 1, in some embodiments of the runway incursion warning system, it may be desirable to include the timing relay 22. Occasionally, situations may occur where a particular transceiver is triggered only momentarily. For example, an animal may run across a monitored intersection. The transceiver will transmit a warning signal only so long as the triggering object is wit in the transceiver's dispersion area. In the case of an animal running across a monitored intersection, this time period may be less than the time required to play the recorded warning message. This may result in an abrupt termination of the message or other annunciator error. This problem may be readily solved by including a timing relay with each transceiver. The timing relay maintains transmission of the warning signal for a predetermined period of time whenever the transceiver is triggered. Typically, this period will be long enough to allow the annunciator to fully play the warning message. In more sophisticated embodiments, the timing relay may be replaced with a signal strength meter and filtering circuitry, in which the meter discriminates between weak and strong transceiver signals and the filter only allows strong signals indicative of a ground vehicle or aircraft to be transmitted to the annunciator.

Figure 2:
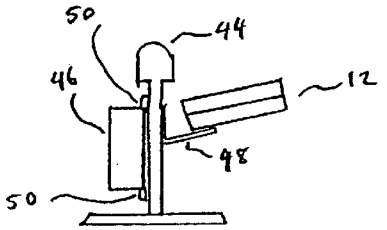
FIG. 2 is a schematic illustration of an embodiment of the present invention where the motion detector and associated hardware are integrated with a runway light.

Referring now to FIG. 2, a particularly preferred embodiment of the runway incursion system 10, where the system is integrated with a typical breakaway runway or taxiway lamp 44, is shown. Due to the need to control costs at small and medium sized airports, it is desirable that a ground traffic control system utilize the existing power deli very infrastructure to the extent practicable. Since runway lamps are spaced at predetermined intervals along the runways of lost U.S. airports, and such lamps are naturally located at the critical runway/taxiway intersections of a particular airport. It is desirable to integrate the warning system of the present invention with such lamps and to utilize the pow r lines for those lamps to supply power to the microwave transceivers.

In order to integrate the exemplary microwave transceiver 12 with the runway or taxiway lamp 44, the power used by the lamp must be converted to a form suitable for use by the transceiver. Runway and taxiway lamps typically operate from constant current 120 volt AC power sources. The microwave transceivers typically require a constant voltage 24 volt AC power source. Therefore, the power adapter 18 (FIG. 1) is required to convert the runway or taxiway lamp power to a form suitable for use by the microwave transceivers. In the exemplary embodiment, the power adapter is a step-down transformer. It is also desirable to include the fuse 20 in the electrical connection to the power adapter to protect the warning system 10 from possible voltage surges in the runway or taxiway lamp power system. Those skilled the art will understand that the present invention runway incursion system may be deployed with its own independent power network 19 (FIG. 1) and that the system may be readily adapted to operate from power sources other than runway or taxiway lighting circuits. In addition, microwave transceivers suitable for use in the system of the present invention are available that utilize either AC or DC power and which utilize other operating voltages. Therefore, the system of the present invention may be adapted to operate from a wide array of existing airport power sources, which include, but are not limited to runway and taxiway lamps.

The transceiver 12 may be connected to the structure of the breakaway lamp 44 by means of an angle bracket 48 or by any other suitable means. The step-down transformer 18, the fuse 20, and the optional timing relay 22, as well as associated wiring, are conveniently housed in a junction box 46, which may be any suitable enclosure. The junction box is attached to the runway or taxiway lamp by means of brackets 50, or any other suitable attachment means. In the exemplary embodiment, the transceiver warning signal is transmitted to the annunciator 24 via a communications cable such as a telephone cable. However, in other embodiments, the warning signal may be transmitted to the annunciator by radio frequency or other means. Such techniques are known to those skilled in the art.

The present invention provides a low cost, effective, runway incursion detection and warning system which may be deployed at most U.S. airports, and at those of many other countries. The system may be integrated with a typical breakaway runway or taxiway lamp which allows for easy installation at critical runway/taxiway and other intersections. The system may use existing runway or taxiway light power systems for a power source. Furthermore, unlike long wave-length radar systems, the microwave radar transceiver used in the present invention can effectively detect aircraft and ground vehicles in inclement weather such rain, snow, and fog. While only the presently preferred embodiments have been described in detail, as will be apparent to those skilled in the art, modifications and improvements may be made to the system and method disclosed herein without departing from the scope of the invention. Accordingly, it is not intended that the invention be limited except by the appended claims.

What is claimed is:

1. An air port runway incursion detection and warning system for monitoring ground traffic in the vicinity of a runway of an airport, the system comprising:

a plurality of microwave radar transceivers, the transceivers set to selectively detect incoming or outgoing traffic, wherein each transceiver transmits a signal upon detecting the incoming or outgoing traffic;

an annunciator, wherein the annunciator plays a prerecorded voice warning message in response to each of the signals transmitted by the microwave radar transceivers.

2. The runway incursion detection and warning system of claim 1, wherein the annunciator plays a voice warning message which is unique to each particular transceiver.

3. The runway incursion detection and warning system of claim 1, wherein each transceiver includes a power adapter to allow the transceiver to be connected to existing runway or taxiway power sources.

4. The runway incursion detection and warning system of claim 3, wherein the power adapter is a step-down transformer.

5. The runway incursion detection and warning system of claim 1, wherein each transceiver includes a time delay relay, wherein once a particular transceiver is triggered, the relay maintains the particular transceiver's signal for a predetermined period of time.

6. The runway incursion detection and warning system of claim 1, wherein each transceiver includes filtering circuitry such that only strong transceiver signals indicative of an aircraft or ground vehicle are transmitted to the annunciator.

7. An air port runway incursion detection and warning system for monitoring ground traffic in the vicinity of a runway of an airport, the system comprising:

a microwave radar transceiver, the transceiver set to selectively detect incoming or outgoing traffic, wherein the transceiver transmits a signal upon detecting the incoming or outgoing traffic;

an annunciator, wherein the annunciator plays a prerecorded voice warning in response to the signal transmitted by the microwave radar transceiver.

8. The runway incursion detection and warning system of claim 7, wherein the system includes a power adapter to allow the system to be connected to existing runway power sources.

9. The runway incursion detection and warning system of claim 8, wherein the power adapter is a step-down transformer.

10. The runway incursion detection and warning system of claim 8, wherein the power adapter is connected to a power source independent of the runway or taxiway lights.

11. The runway incursion detection and warning system of claim 7, wherein the transceiver includes a time delay relay, wherein once the transceiver is triggered, the relay maintains the transceiver's signal for a predetermined period of time.

12. The runway incursion detection and warning system of claim 7, wherein the system includes filtering circuitry such that only strong transceiver signals indicative of an aircraft or ground vehicle are transmitted to the annunciator.

13. An airport runway incursion detection and warning system for monitoring ground traffic in the vicinity of a runway of an airport, the system comprising:

a plurality of microwave radar transceivers, the transceivers set to selectively detect incoming or outgoing traffic, and to transmit a signal upon detecting the incoming or outgoing traffic, wherein each transceiver is integrated with a runway or taxiway lamp;

an annunciator, wherein the annunciator plays a prerecorded voice warning message in response to each of the signals transmitted by the microwave radar transceivers.

14. The runway incursion detection and warning system of claim 13, wherein the runway lamp is breakaway lamp.

15. The runway incursion Detection and warning system of claim 13, wherein the annunciator plays a voice warning message which is unique to each particular transceiver.

16. The runway incursion detection and warning system of claim 13, wherein each transceiver includes a power adapter to allow the transceiver to be run from the same power source as used by the runway or taxiway lamp, and wherein the power adapter is integrated with the lamp.

17. The runway incursion detection and warning system of claim 16, wherein the power adapter is a step-down transformer.

18. The runway incursion detection and warning system of claim 16, wherein the power adapter is connected to a power source independent of the runway or taxiway lights.

19. The runway incursion detection and warning system of claim 13, wherein each transceiver includes a time delay relay, wherein once a particular transceiver is triggered, the relay maintains the particular transceiver's signal for a predetermined period of time, and wherein the time delay relay is integrated with the lamp.

20. The runway incursion detection and warning system of claim 19, wherein each transceiver includes filtering circuitry such that only strong transceiver signals indicative of an aircraft or ground vehicle are transmitted to the annunciator.

21. The runway incursion detection and warning system of claim 13, wherein each transceiver includes filtering circuitry such that only strong transceiver signals indicative of an aircraft or ground vehicle are transmitted to the annunciator, and wherein the filtering circuitry is integrated with the lamp.

22. An airport runway incursion detection and warning system for monitoring ground traffic in the vicinity of a runway of an airport, the system comprising:

a plurality of microwave radar transceivers, the transceivers set to selectively detect incoming or outgoing traffic, and to transmit a signal upon detecting the incoming or outgoing traffic;

each transceiver being integrated with a breakaway or runway or taxiway lamp, and each transceiver including a step-down transformer, wherein the transformer allows the transceiver to operate from the same power source as the lamp;

each transceiver fur her including a time delay relay, wherein once the transceiver is triggered, the relay maintains the transceiver's signal for a predetermined period of time; and an annunciator, wherein the annunciator plays a prerecorded voice warning message in response to each of the signals transmitted by the microwave radar transceivers, and wherein the voice warning message is unique to each particular transceiver.

* * * * *

UNITED STATES PATENT AND TRADEMARK OFFICE
CERTIFICATE OF CORRECTION

PATENT NO. : 6,486,825 B1
DATED : November 26, 2002
INVENTOR(S) : Donald L. Smithey It is certified that error appears in the above-identified patent and that said Letters Patent is hereby corrected as shown below:

Title page,
Item [57], ABSTRACT,
Line 2, delete "he" and insert -- the --.
Line 8, delete "all w" and insert -- allow --.

Column 1,
Line 7, delete "ore" and insert -- more --.
Line 8, delete "an" and insert -- on --.
Line 29, delete "ay" and insert -- may --.
Line 58, delete "advantage" and insert -- advantages --.

Column 2,
Line 5, delete "t o" and insert -- to --.
Line 7, delete "p resent" and insert -- present --.
Line 9, delete "arrange"" and insert -- arranged --.
Line 12, delete "air raft" and insert -- aircraft --.
Line 45, delete "ma" and insert -- may --.

Column 3,
Line 9, delete "r" and insert -- or --.
Line 20, delete "An Arbor"and insert -- Ann Arbor --.
Line 38, delete "here" and insert -- there --.

Column 4,
Line 16, delete "wit in" and insert -- within --.
Line 38, delete "deli very" and insert delivery --.
Line 57, delete "pow r" and insert -- power --.

UNITED STATES PATENT AND TRADEMARK OFFICE

CERTIFICATE OF CORRECTION

PATENT NO. : 6,486,825 B1
DATED : November 26, 2002
INVENTOR(S) : Donald L. Smithey It is certified that error appears in the above-identified patent and that said Letters Patent is hereby corrected as shown below:

<u>Column 5,</u>
Lines 35 and 65, delete “air port” and insert -- airport --.

<u>Column 6,</u>
Line 41, delete “Detection”and insert -- detection --.

<u>Column 7,</u>
Lines 8-9, delete “transceiv-ers” and insert -- transceiver --.

<u>Column 8,</u>
Line 13, delete “fur her” and insert -- further --.

Signed and Sealed this

Fifth Day of April, 2005

JON W. DUDAS
*Director of the United States Patent and Trademark Office*